ROSS & MARSHALL.

Sewing Machine Case.

No. 1,145. Reissued Feb. 26, 1861.

Witnesses.

Frank Parsons

J. T. Ellis

Inventors.

F. A. Ross

F. A. Marshall

N. PETERS. Photo-Lithographer. Washington, D. C.

UNITED STATES PATENT OFFICE.

F. A. ROSS AND WM. H. MARSHALL, OF NEW YORK, N. Y.

IMPROVEMENT IN SEWING-MACHINE CASES.

Specification forming part of Letters Patent No. 13,499, dated August 28, 1855; Reissue No. 1,145, dated February 26, 1861.

*To all whom it may concern:*

Be it known that we, FRANCIS A. ROSS and WILLIAM H. MARSHALL, of the city, county, and State of New York, have invented a new and useful Combination of a Case or Cabinet with a Sewing-Machine; and I hereby declare that the following, taken in connection with the drawings, is a full, clear, and exact description thereof.

Figure 1:
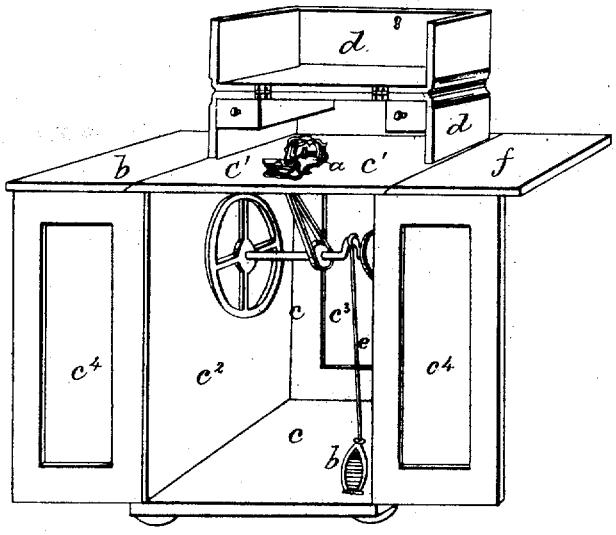
Figure 2:
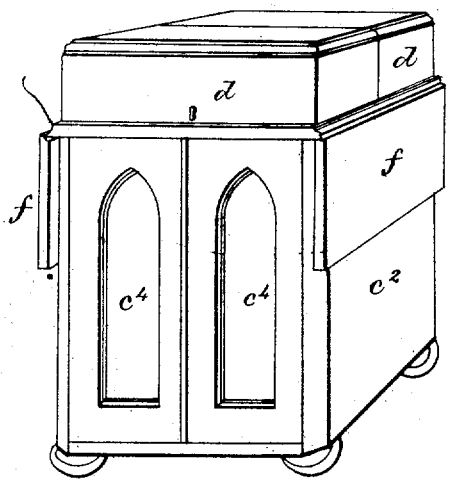

In the drawings, Figure 1 is a perspective view of the machine in the case with the doors open and the top raised and the table spread. Fig. 2 is a perspective of the case shut up, so as to inclose the machine.

Prior to the date of our invention sewing-machines had been applied on top of tables made on purpose for them, or on ordinary work-benches, and were, when thus applied, suitable for factories and work-rooms. They were, however, unsuited in appearance for rooms and parlors of dwelling-houses, and were, moreover, liable to injury from damp and dust and from careless handling by servants or others unacquainted with their use. Machines thus applied to tables were, moreover, dangerous to children, who could turn the machines, and might be injured by the wheels or other parts of the machinery. Our invention obviates these difficulties and makes the machine as a whole a handsome article of furniture; and the nature of the first part of our invention consists in combining a sewing-machine with a cabinet or case in such manner that the needle-stock bar or arm of the machine lies above the upper surface of the cabinet, while the foot-pedals and connecting-rod are inclosed in the cabinet, said cabinet or case being provided with a door or doors, which, when opened, permit the operator to place his feet upon the pedals; and the nature of the second part of our invention consists in combining with a cabinet and a sewing-machine a box or cover so contrived substantially as described that it may at pleasure be made to inclose those parts of the machine which lie above the upper surface of the cabinet, or may be made to uncover them when it is desirred to use the machine; and the nature of the third part of our invention consists in combining with a sewing-machine cabinet side leaves which may be raised and lowered, and when raised shall be supported by the doors of the machine.

In the drawings the sewing-machine is shown at *a a*, the foot-pedal at *b*, and the connecting-rod at *c*.

The cabinet proper is represented at *c c*, its upper surface at $c'$ $c'$, its sides at $c^2$ $c^2$, its back at $c^3$, and its doors at $c^4$ $c^4$. On its upper surface is a box or cover, *d d*, one-half of which in the present instance is shown as secured permanently to the upper surface of the cabinet, while the other half is hinged thereto in such manner that it may be thrown back, as in Fig. 1, to uncover the machine, so that it is ready to operate on cloth, or thrown forward and downward, as in Fig. 2, to cover the machine entirely, the material point about this box being that it shall at pleasure be capable of concealing and protecting the parts of the machine above the cabinet, and also of being thrown back or removed, so that the machine may be as free to the operator as if no box were used.

To the sides of the cabinet are hinged leaves *f f*, which may be dropped, as in Fig. 2, or raised, as in Fig. 1, when they are to be supported by the tops of the doors, which are to be swung out under them, as clearly shown in Fig. 1. These leaves when raised afford a large surface of table for the use of the operator, are securely supported by the doors, and need no unsightly brackets for their support, the doors being so arranged as to swing back under the leaves.

A reference to the drawings will show that all the parts of the machine when the doors are shut and the cover down are perfectly protected from injury by damp, dust, or intermeddling of unskilled persons, and that children cannot reach or injure themselves with any parts of the machine.

The characteristics of the cabinet are that it incloses the pedal and connecting-rod when the doors are shut, supports the machine, and, by reason of its having doors, admits of free access to the pedal when the machine is needed for use.

The characteristics of the cover are, that it may either inclose all parts of the machine above the upper surface of the cabinet or may be removed therefrom, so that work may be done upon the machine.

The cabinet will be useful even without the cover, but will be more useful with it and with the leaves. The cabinet should be of a proper height for the easy management of the work being done and sufficiently wide to admit freely the feet, and, if necessary, part of the dress, of the operator. Three feet answers well for height and twenty-one inches for the width; but these dimensions may be varied.

Proper locks or other fastenings should be applied to the doors and also to the cover, so that all parts of the machine may be unapproachable, except to those provided with a key.

We claim as of our own invention—

1. The combination of a cabinet provided with a proper door or doors with a sewing-machine in such manner that the foot-pedal of the machine shall be inclosed by the cabinet, and the needle-stock arm or bar shall be above its upper surface, the combination being substantially such as described.

2. In combination with a cabinet and a sewing-machine, the former provided with doors and inclosing the foot-pedal of the latter, a box or cover substantially such as described, and serving the purposes specified, the combination being substantially such as is herein set forth.

3. Combining with a cabinet protecting a sewing-machine side leaves and doors so constructed that the doors shall support the leaves when raised up, the whole combination being substantially such as hereinbefore specified.

In testimony whereof we have hereunto subscribed our names, in the city of New York, on this 28th day of January, A. D. 1861.

F. A. ROSS.
WM. H. MARSHALL.

In presence of—
J. T. ELLIS,
FRANK PARSONS.